April 6, 1965  P. F. SIKORA  3,176,499
HIGH TEMPERATURE TESTING APPARATUS
Filed May 24, 1962  2 Sheets-Sheet 1

INVENTOR
PAUL F. SIKORA

BY
ATTORNEYS

April 6, 1965          P. F. SIKORA          3,176,499

HIGH TEMPERATURE TESTING APPARATUS

Filed May 24, 1962          2 Sheets-Sheet 2

INVENTOR
PAUL F. SIKORA

BY

ATTORNEYS

United States Patent Office 3,176,499
Patented Apr. 6, 1965

3,176,499
HIGH TEMPERATURE TESTING APPARATUS
Paul F. Sikora, Parma Heights, Ohio, assignor to the United States of America as represented by the Administrator of the National Aeronautics and Space Administration
Filed May 24, 1962, Ser. No. 197,554
1 Claim. (Cl. 73—15.6)
(Granted under Title 35, U.S. Code (1952), sec. 266)

The invention described herein may be manufactured and used by or for the Government of the United States of America for governmental purposes without the payment of any royalties thereon or therefor.

This invention is concerned with determining mechanical properties of materials at high temperatures, and more particularly with testing refractory materials at temperatures above 2500° F. in a vacuum or inert atmosphere. The invention is especially directed to an improved heating apparatus which assures ease in the installation of the test specimen.

Refractory metals have been tested at high temperatures by mounting a specimen of the metal in a tensile testing machine and heating the specimen by passing an electric current through it. However, self-resistance heating of this type is limited to materials that are electrical conductors.

A solution to this problem has been to radiantly heat the specimen from a graphite heater, but diffusion of carbon from the heater precludes its use in testing refractory metals where contamination of the specimen is objectionable. Moreover, when it was necessary to test the specimen in either a vacuum or an inert atmosphere the apparatus became cumbersome, and it was difficult to install a specimen in the proper alignment with the heater.

It is, therefore, an object of the present invention to provide apparatus for determining mechanical properties of a refractory material in a vacuum or inert atmosphere at elevated temperatures in which a specimen of any refractory material is readily mounted.

A further object of the invention is to provide a high temperature testing apparatus which will accommodate relatively small samples of refractory material.

Another object of the invention is to provide an improved heating apparatus for ultra-high temperature tensile testing.

Further objects of the invention will be apparent from the description that follows and from the drawings wherein like numbers are used throughout to identify like parts.

In order to achieve the aforementioned objects, there is provided a load train for applying opposed forces along the longitudinal axis of an elongated specimen of refractory material to provide a tension load when the specimen is mounted in a chamber. This chamber has a fixed section that is rigidly mounted on the base for the load train and a movable section that is hingedly mounted on the fixed section for providing access to the chamber. A vacuum pump is connected to the chamber to lower the pressure therein and a heater is provided for raising the temperature of the specimen to a predetermined value.

Figures 1, 2:
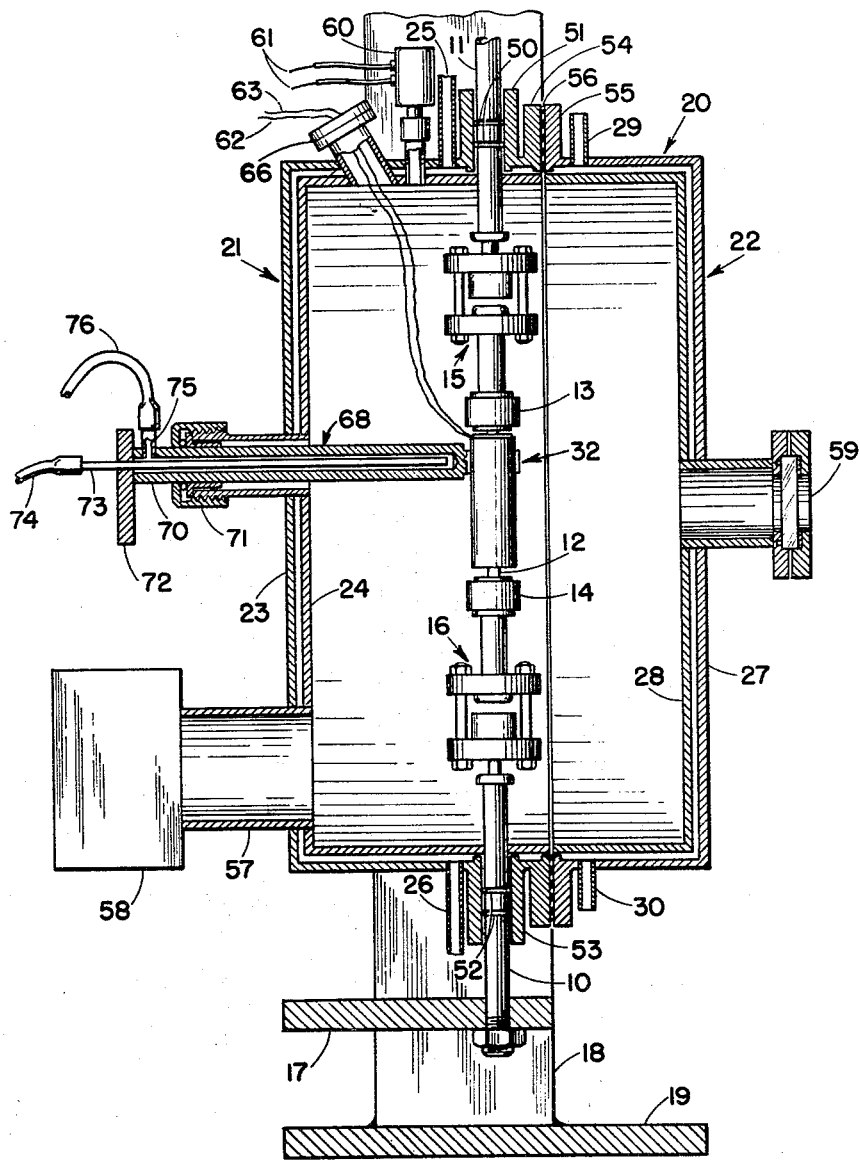
FIG. 1 is a vertical sectional view of a high temperature tensile testing apparatus constructed in accordance with the invention.
FIG. 2 is an enlarged section view of the end portion of an electrode cosntructed in accordance with the invention.

Referring now to FIG. 1, pull rods 10 and 11 in a load train of either a conventional screw-driven tensile testing machine or a conventional stress rupture frame apply tension forces to a specimen 12 of refractory material through pin-type grips 13 and 14 that selectively hold opposite ends of the specimen. An aligning device 15 is mounted between the pull rod 11 and the grip 13 while a similar aligning device 16 is likewise interposed between the pull rod 10 and the grip 14. The aligning devices 15 and 16 make certain that the tenison forces are applied along the longitudinal axis of the specimen 12.

The lower pull rod 10 has its upper end mounted on the aligning device 16 and its opposite end secured to a rigid base 17 extending longitudinally from a vertical support 18 in the stress rupture frame. The upper pull rod 11 has its lower end mounted on the aligning device 15 and its upper end secured to a movable cross head (not shown) in a manner well known in the art. The vertical support 18 protrudes upward from a plate 19 which forms a rigid foundation for the testing apparatus and the plate 19 extends longitudinally to a similar vertical support (not shown). The cross head at the upper end of these supports moves the grip 13 away from the grip 14 with either a constant or a variable velocity in a manner that is likewise well known in the art. In tensile testing the fixed member is at the top and the movable member is at the bottom.

A water-cooled chamber 20 encloses the specimen 12, together with the grips 13 and 14, as well as the aligning devices 15 and 16 as shown in FIG. 1. The chamber 20 includes a fixed section 21 that is rigidly secured to the supports on the plate 19 and a movable section 22 that is hingedly mounted on the fixed section 21. The fixed section 21 comprises an outer shell 23 that is spaced from an inner shell 24 and water is circulated through the space between these shells from an inlet pipe 25 to an outlet pipe 26. The movable section 22 comprises an outer shell 27 that is spaced from an inner shell 28 and cooling water is likewise circulated between these shells from an inlet pipe 29 to an outlet pipe 30. The inner shells 24 and 28 are preferably fabricated from a strong non-corrosive material such as stainless steel.

Sliding seals 50 in the form of lubricated O rings in a guide 51 at the top of the fixed section 21 accommodate the pull rod 11 while similar O rings 52 in a guide 53 at the bottom of this section encircle the pull rod 10. The movable section 22 is adapted to swing from an open position (not shown) which provides access to the grips 13 and 14 for the insertion of the specimen 12 to a closed position shown in FIG. 1. An airtight seal is formed between the sections 21 and 22 in the closed position by flanges 54 and 55 which have a gasket 56 between their mating surfaces.

A pipe 57 which extends through the fixed section 21 is connected to a low pressure source 58 such as a vacuum pump for reducing the pressure in the chamber 20 while a sight window 59 is provided in the movable section 22 to observe the specimen 12. The low pressure vacuum source 58 is capable of reducing the pressure within the chamber to less than 0.1 micron and this pressure is observed on a vacuum gauge 60 having leads 61 that are adapted to be connected to a conventional recording instrument if desired. Wires 62 and 63 extend into the chamber 20 for contacting thermocouples 64 and 65 secured to the specimen 12 as better seen in FIG. 3 through a port 66 in the fixed section 21.

Figures 3, 4:
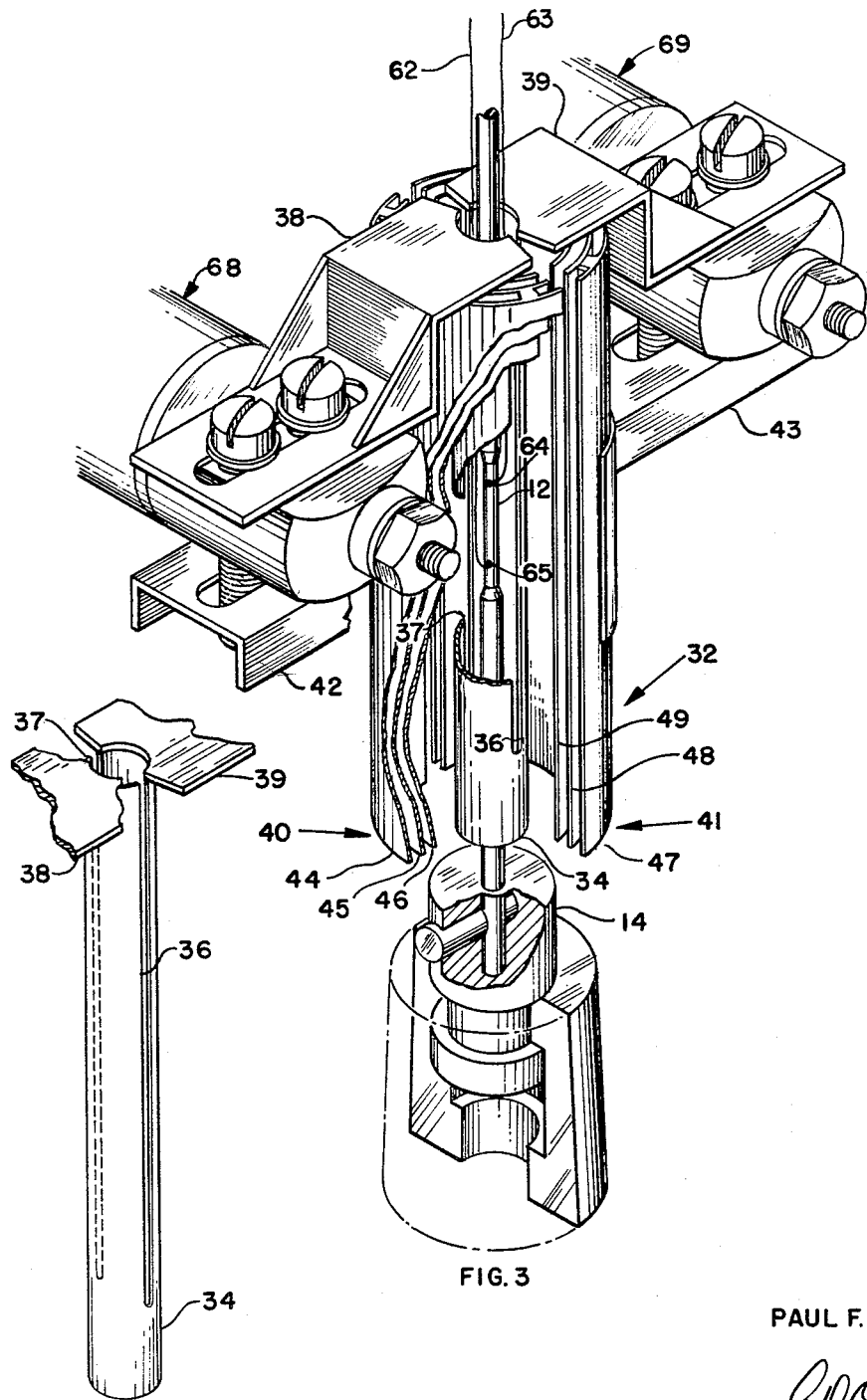
FIG. 3 is an enlarged perspective view, with parts broken away, showing the heater for the testing apparatus illustrated in FIG. 1.
FIG. 4 is a perspective view of a portion of the heater shown in FIG. 3.

A pair of power leads 68 and 69 shown in FIG. 3 extend into the chamber 20 through the shells 23 and 24 of the fixed section 21 as shown in FIG. 1. Each lead electrically-conducting material extending through a pressure seal 71 and the cylinder is mounted on an electrically conducting plate 72 that is adapted to be secured to comprises an elongated cylindrical member 70 of an a bus bar (not shown) or other source of electrical power. A suitable pipe 73 extends through the plate 72 into a longitudinally extending passage in the cylindrical member 70 and a cooling fluid is pumped through the pipe 73 from a source (not shown) via hose 74 to the end of the cylindrical member 70 opposite the plate 72. The fluid then flows along the outside of the pipe 73 to a fitting 75 on the cylindrical member 70 adjacent the plate 72 where it is discharged through a hose 76.

A support 77 is mounted for spherical movement on the end of the cylindrical member 70, as shown in FIG. 2. The support 77 has spaced flat surfaces 78 and 79 while the opposite ends 80 and 81 have convex spherical contours. The spherical end 80 engages a mating concave spherical surface 82 in the end of the elongated cylindrical member 70 and a stud 83 extends from the center of the surface 82 through a hole in the support 77 extending from the end 80 to the end 81. A nut 84 on the end of the stud 83 moves a washer 85 having a concave spherical face into engagement wtih the end 81 while maintaining the end 80 in contact with the surface 82. The inside diameter of the hole in the support 77 is substantially larger than the outside diameter of the stud 83, thereby permitting adjustment of the position of the flat surfaces 78 and 79 relative to the cylinder 70.

According to the present invention the specimen 12 is heated to a predetermined temperature by a resistance heater 32 which comprises a cylindrical tube 34 that is preferably of tantalum or tungsten. The tube 34 has a pair of spaced slits 36 and 37 extending downward from the upper end thereof to insure even current flow throughout all portions of the tube thereby providing for even heating, and both slits terminate a short distance from the lower end, as shown in FIG. 4. For example, a ⅝-inch diameter seamless tube of tantalum five inches long having a pair of diametrically-opposed slits extending to within ½-inch of the bottom was used to heat a specimen having a diameter of ⅛-inch.

A pair of opposed brackets 38 and 39 extend radially outward from the tube axis and these brackets are secured to the tube 34 on opposite sides of the slits 36 and 37, as shown in FIG. 4. The brackets 38 and 39 are of the same material as the tube 34 and are selectively connected to the power leads 68 and 69 while supporting the tube from the upper end only for unrestricted expansion and contraction during heating and cooling. The current flows from the power lead 68 through the bracket 38 to the tube 34 where it flows downward along one side of the slits 36, 37 and upward on the opposite side to the bracket 39 and power lead 69.

A pair of spaced, hemicylindrical radiation shields 40 and 41 that are preferably of the same material as the tube 32 enclose this tube to concentrate the heat on the specimen 12 by radiating heat back to the tube and thence to the specimen. The shields 40 and 41 are secured to bars 42 and 43, respectively, they are mounted on the leads 68 and 69. The shield 40 comprises three spaced, curved plates 44, 45 and 46 while the mating shield 41 comprises similar plates 47, 48 and 49. Specimens have been successfully heated to temperatures as high as 5400° F. by the heater 32.

In a typical test specimens 12 of the type previously mentioned were ground from ⅛-inch diameter bars of commercially-pure sintered tungsten and the specimens were then subject to a recrystallization treatment of 4050° F. for one hour in a vacuum of 0.1 micron to insure uniformity in the material over the entire test range during subsequent heating. The chamber 20 was opened by swinging the movable section 22 outward from the fixed section 21 and one of the specimens having suitable thermocouples secured thereto was passed through the port 32 and inserted into the tube 34. After the grips 14 and 15 were secured to the opposite ends of the specimen 12 and the heater 32 was properly aligned therewith by moving the supports 77, the movable section 22 was moved to the closed position shown in FIG. 1 and the flanges 54 and 55 were bolted together. The vacuum pump 58 was started and the pressure within the chamber 20 was reduced to less than 0.1 micron whereupon the specimen 12 was heated to the desired test temperature by passing an electric current through the tube 34. The specimen 12 was maintained at the test temperature for about ten minutes whereupon it was loaded to fracture.

Each of the specimens was mounted in the chamber 20 in this manner and heated to a test temperature in the range between 2500° F. and 4000° F. The specimens were loaded to fracture at various speeds of the grip 13.

While the preferred form of the invention has been described, various modifications may be made to the disclosed structure without departing from the spirit of the invention or the scope of the subjoined claim. For example, it is contemplated that a source of inert gas may be substituted for the vacuum pump 58.

What is claimed is:

An apparatus for determining mechanical properties of a refractory material specimen at a high temperature comprising, gripping means for selectively holding opposite ends of the specimen, pulling means mounted in a frame and secured to said gripping means for supplying forces thereto along the longitudinal axis of the specimen to load the same in tension, a chamber for enclosing said gripping means and the specimen when the specimen is held by said gripping means, said chamber comprising, a first section rigidly mounted on said frame, and a second section hingedly connected to said first section for providing access to said gripping means for the insertion of the specimen, a heater for raising the temperature of said specimen to a predetermined value in said chamber, said heater including a heated hollow member positioned between said gripping means for receiving the specimen, said hollow member having an inner surface in close proximity with the specimen in said gripping means for maximum heating thereof, a rigid member extending through said first section into said chamber toward said heater, a support secured to said heater, and a stud extending outwardly from said rigid member through said support with a surface on said support being in engagement with a surface on said rigid member, said surface on said support having a spherical configuration and said surface on said rigid member being curved to mate with said support surface, both of said surfaces being in selective engagement with one another for selectively altering the position of said support relative to said rigid member thereby enabling said hollow member to be aligned with the specimen in said gripping means whereby the specimen is maintained out of contact with said inner surface of said hollow member.

(References on following page)

References Cited by the Examiner

UNITED STATES PATENTS

| | | | |
|---|---|---|---|
| 2,337,679 | 12/43 | Osterberg | 13—31 |
| 2,375,032 | 5/45 | Parke et al. | 73—15.6 |
| 2,732,708 | 1/56 | Linhorst | 73—15.6 |
| 2,971,039 | 2/61 | Westeren | 13—25 |
| 3,057,936 | 10/62 | Hill | 219—19 X |

OTHER REFERENCES

Article by Smith et al.: "Testing Machine for Short-Time Creep and Stress-Rupture Testing at 2000 to 2500° C.," from Review of Scientific Instruments, vol. 28, No. 7, July 1957 (pages 543–547).

RICHARD C. QUEISSER, *Primary Examiner.*